United States Patent [19]
Smolinske et al.

[11] Patent Number: 5,535,210
[45] Date of Patent: Jul. 9, 1996

[54] METHOD AND SYSTEM FOR RESOLUTION OF CHANNEL ACCESS IN DATA TRANSMISSION SYSTEMS

[75] Inventors: Jeffrey C. Smolinske, Hoffman Estates; Christopher L. Clanton, Chicago; Phieu M. Tran, Lincolnwood, all of Ill.

[73] Assignee: Motorola, Inc., Schaumburg, Ill.

[21] Appl. No.: 283,124

[22] Filed: Jul. 29, 1994

[51] Int. Cl.⁶ .............................. H04B 7/212; H04J 3/12; H04Q 7/20
[52] U.S. Cl. .................. 370/85.2; 370/94.1; 370/95.3; 370/110.1; 455/54.2
[58] Field of Search ...................... 370/85.1–85.3, 370/85.6–85.8, 94.1, 95.1–95.3, 104.1, 110.1; 379/58, 59, 63; 455/53.1, 54.1, 54.2; 340/825.44, 825.5, 825.51; 371/6, 20.2, 20.4, 24, 32, 34, 67.1, 69.1

[56] References Cited

U.S. PATENT DOCUMENTS

| | | | |
|---|---|---|---|
| 4,434,421 | 2/1984 | Baker et al. | 340/825.51 |
| 4,630,264 | 12/1986 | Wah et al. | 370/85.3 |
| 4,716,407 | 12/1987 | Borras et al. | 340/825.04 |
| 4,774,707 | 9/1988 | Raychaudhuri | 370/85.2 |
| 5,166,929 | 11/1992 | Lo | 370/85.3 |
| 5,303,234 | 4/1994 | Kou | 370/85.2 |
| 5,307,349 | 4/1994 | Shloss et al. | 370/85.2 |
| 5,329,405 | 7/1994 | Hou et al. | 395/800 |

OTHER PUBLICATIONS

Daniel F. Lyons & P. Papantoni–Kazakos, "A Window Random Access Algorithm for Environments", IEEE Transactions on Communications, vol. 37, No. 7, Jul. 1989, pp. 766–770.

Ying–Tu Wu & Jin–Fu Chang, "Collision Resolution for Variable–Length Messages", IEEE Transactions on Communications, vol. 41, No. 9, Sep. 1993, pp. 1281–1283.

"Baseline Text For Tag 3 (PACS)", Motorola, Inc. Contact C. Stephen Hawkins, Feb. 2, 1995, Joint Technical Committee (JTC).

Primary Examiner—Alpus H. Hsu
Attorney, Agent, or Firm—Darleen J. Stockley

[57] ABSTRACT

A novel scheme efficiently indicates to a plurality of users which user has been granted access to a multi-access packet channel. Transmission and reception of a predetermined limited number of echo bits per timeslot reduces bandwidth usage, and over the duration of a packet, these bits are equivalent to a variable length random identification number which is used for identifying which user has been granted access.

6 Claims, 3 Drawing Sheets

100

200

METHOD AND SYSTEM FOR RESOLUTION OF CHANNEL ACCESS IN DATA TRANSMISSION SYSTEMS

FIELD OF THE INVENTION

The present invention relates generally to access control in a communication system, and more particularly to access resolution detection in a communication system.

BACKGROUND

A multiterminal communication network typically provides more cost-effective communication between a plurality of users than use of exclusively owned or rented channels. Such a network includes a number of data sources, data sinks and a number of channels connecting the data sources and data sinks. In a digital communication system the outputs of the data sources are encoded into serial bit streams, which are then generally packetized for transmission to the data sinks along a packet channel.

A multi-access communication network utilizes a plurality of transmitters and receivers. Generally, such a network contains many elements, such as multiway feedback, that contribute to the complexity of operation. Sharing of the multi-access communication network by many users creates the problem of contention resolution, which is usually handled by blocking and delay. Sharing of the channel by a multiplicity of users necessitates a system of sharing that avoids simultaneous transmissions by different users. One method of sharing the channel, termed fixed-assignment multi-access signaling, is to break it down into subchannels and to assign each subchannel to a different user. Another method of sharing the channel, termed random access signaling, allows users to transmit at will. Thus, in random access signaling, collisions of transmissions may occur, resulting in garbling a received signal, or alternatively, one user may be granted access to use the channel. Thus, there is a need for providing access acknowledgment to the user that has been granted access to the packet channel in instances where capture occurs.

BRIEF DESCRIPTIONS OF THE DRAWINGS

DETAILED DESCRIPTION OF A PREFERRED EMBODIMENT

The present invention provides a novel scheme for efficiently indicating, to a plurality of users, which user has been granted access to a multi-access packet channel. The novel scheme utilizes transmission and reception of a predetermined limited number of echo bits to reduce bandwidth usage for identifying which user has "captured" access. Generating new echo bits for every segment of the packet is equivalent to using a variable length random identification number based on a packet size and segmentation.

Accordingly, in packet channel systems, a protocol is needed to decide which packet channel users will be granted access to the channel. To try to gain access to the packet channel during periods when the channel is idle, users transmit access requests, i.e., ARs, on the packet channel. Each AR contains information that identifies the user to the receiver. The receiver of the ARs arbitrates use of the packet channel. Where the receiver receives an AR, the packet channel is now considered busy and is reserved for the use of the user that originated the AR. The receiver, utilizing the present invention, indicates that the packet channel is busy to all other potential channel users and also indicates which user is transmitting on the channel.

When multiple users transmit ARs simultaneously, collisions occur at the receiver. Collisions generally result in no single AR being received correctly. However, one of the ARs may "capture", i.e., be granted access to, the receiver. When a capture occurs, the user that originated the AR for the capture is granted access to the channel. Then, the receiver broadcasts the identification of the user that has been granted access to the channel. Where no identification is sent, all of the users continue to try to transmit data at the same time, producing more collisions and possibly garbling of data received by the receiver, typically causing a plurality of packet retransmissions. Thus, overall throughput of the system is decreased. To alleviate the problem of the multiplicity of packet retransmissions when a plurality of users are unaware of capture of channel access, the present invention makes use of echo bits. In this invention echo bits are bits of information randomly generated by each user that are used to check grant of access for transmitted data from the user, in which received echo bits are returned to the sending user for comparison with the original echo bits transmitted. Where the returned echo bits match the original echo bits of a user, the user has been granted access to transmit on the packet channel.

Figure 1:
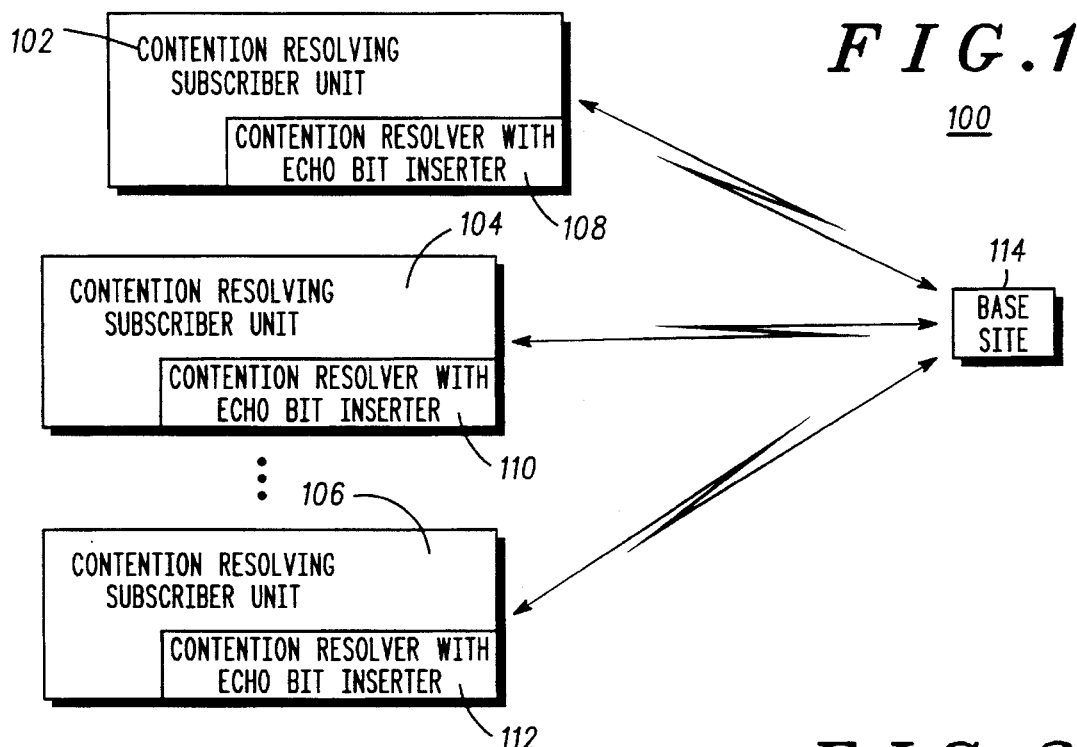
FIG. 1 is a block diagram of a system for resolving contention between a plurality of subscriber units for transmitting data in packets in a slotted communication system to a base site in accordance with the present invention.

FIG. 1, numeral 100, is a block diagram of a system for resolving contention between a plurality of subscriber units for transmitting data in packets in a slotted communication system to a base site in accordance with the present invention. The system includes: A) the plurality of contention-resolving subscriber units (102, 104, ... 106), for transmitting the packets on a packet channel, wherein each contention-resolving subscriber unit includes: a contention resolver (108, 110, ... 112) for randomly generating echo bits and transmitting a packet having the echo bits and a transmit access request to the base site until: in response to receiving echo bits from the base site one of A1-A2: A1) where the echo bits received from the base site match the echo bits transmitted by the contention-resolving subscriber unit, transmitting data in packets on the packet channel, and A2) where the echo bits received from the base site are non-matching with the echo bits transmitted by the contention-resolving subscriber unit, refraining from transmitting; and B) the base site (114), responsive to the packets from the contention-resolving subscriber units, for decoding a first received packet, granting access for the packet channel to a contention-resolving subscriber unit of the first received packet, and transmitting, to the plurality of contention-resolving subscriber units, the echo bits of the contention-resolving subscriber unit of the first received packet to indicate that the contention-resolving subscriber unit of the first received packet has been granted access to the packet channel. The predetermined number of echo bits is typically between two and four bits. The system may also be selected to use a devoted out-of-band signaling channel for transmission of echo bits and transmit access requests and to use the channel in the slotted communication system for transmission of user data.

Figure 2:
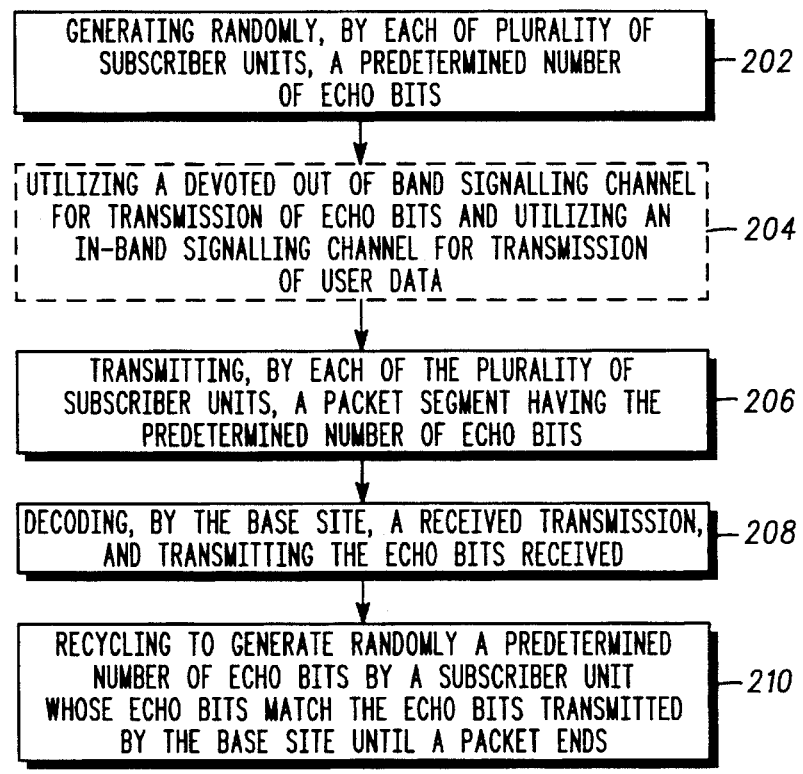
FIG. 2 is a flow chart showing the steps of one implementation of a method for resolving contention between subscriber units in a slotted communication system in accordance with the present invention.

FIG. 2, numeral 200, is a flow chart showing the steps of one implementation of method for resolving contention between subscriber units in a slotted communication system in accordance with the present invention. The method includes the steps of: A) generating randomly, by each of plurality of subscriber units, a predetermined number of echo bits (202); B) transmitting, by each of the plurality of subscriber units, a packet segment having the predetermined number of echo bits (206); C) decoding, by the base site, a received transmission, and transmitting the echo bits received (208); and D) recycling to generating randomly a predetermined number of echo bits by a subscriber unit whose echo bits match the echo bits transmitted by the base site until the packet transmission is completed (210). A workable predetermined number of echo bits is 2, 3 or 4. A devoted out-of-band signaling channel such as the slow channel in a Personal Communications System, for example the PACS, (Personal Access Communication System), may be selected to be used (204), after randomly generating the predetermined number of bits (202), for transmission of echo bits and transmit access requests. An in-band signaling channel such as the fast channel in PACS may be used for transmission of user data. Since PACS supports a 10-bit per time slot slow channel structure, two to four bits are available on PCS for use as echo bits, thereby maximizing bandwidth utilization on the fast channel. The slow channel is a small portion of the PACS time slot which carries the control information such as time slot usage, echo bits, and access type. The fast channel is a larger portion of the PACS time slot which carries mostly user data.

For example, where no packet transmission is being received by each of multiple users A, B, and C, the multiple users determine that the packet channel is idle and may attempt to access it by transmitting ARs to the receiver. Each user, as part of the AR, also transmits a predetermined number of echo bits. In the preferred embodiment, three or four echo bits may be randomly generated by each user. New echo bits are generated in subsequent segment transmissions.

Figure 3:
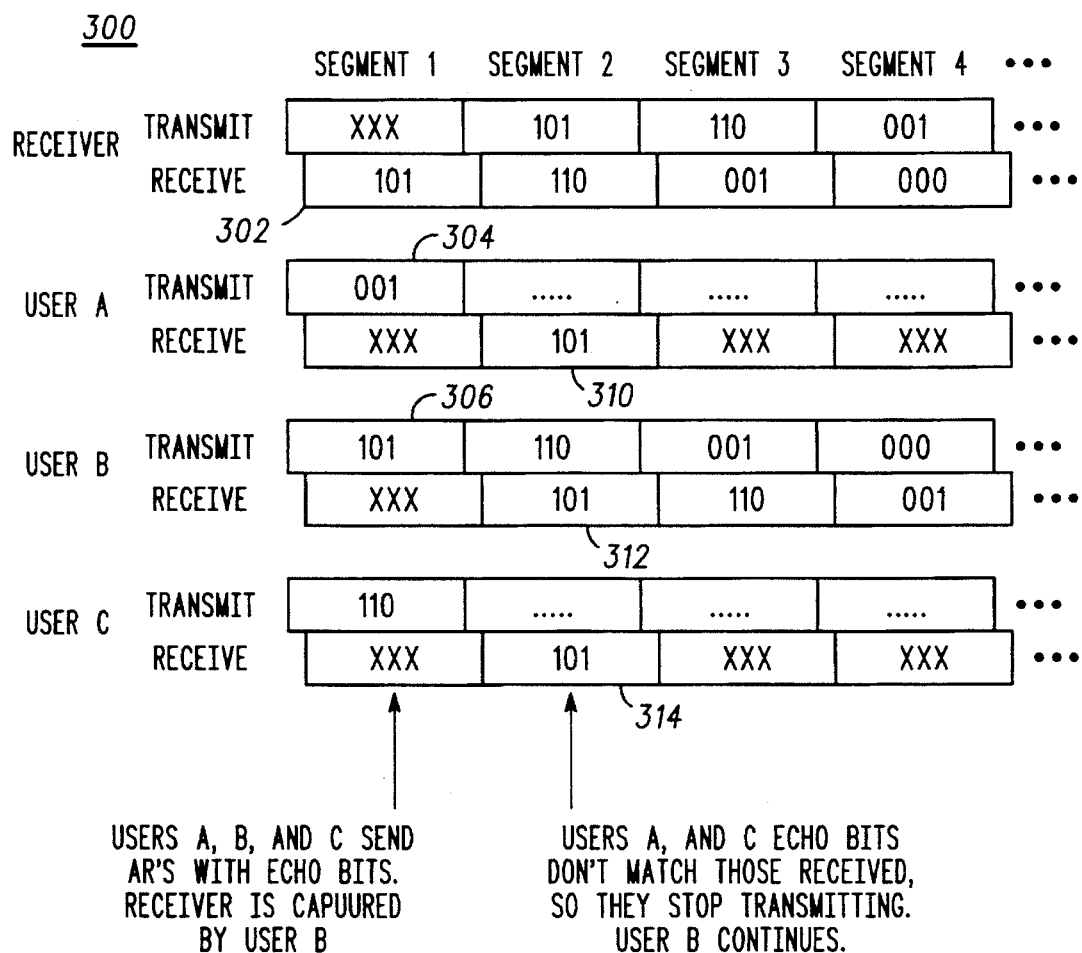
FIG. 3 is a schematic showing packet segments transmitted and received by a Receiver, User A, User B, and User C, respectively, in accordance with the method of the present invention.

FIG. 3, numeral 300, is a schematic showing packet segments transmitted and received by a Receiver, User A, User B, and User C, respectively, in accordance with the method of the present invention. Users A, B, and C transmit three randomly generated echo bits (304, 306, 308, respectively) to the Receiver. Where the Receiver detects the packet segment transmitted by User B (302), the Receiver indicates that the packet channel is busy and is currently granted to User B (310). By including the echo bits of the user granted access, the Receiver indicates which user has been granted access, i.e., the echo bits of User B (310, 312, 314) are 'echoed' back to Users A, B, and C. Users A and C recognize that the received echo bits do not match User A and C echo bits and thus, stop transmitting. User B matches the received echo bits (312) with the echo bits sent with the packet segment of B (306) and continues to transmit. In the schematic of FIG. 3, XXX means three unspecified bits, i.e., don't care bits, are used, and . . . means no transmission.

Figure 4:
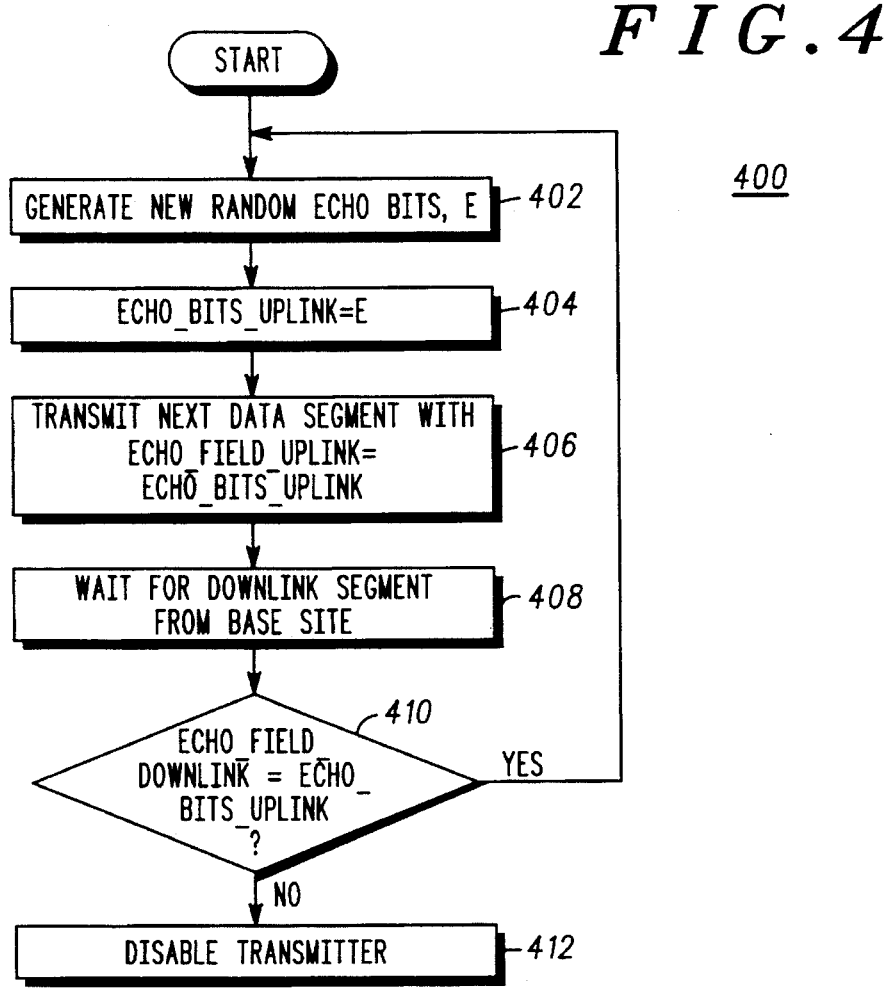
FIG. 4 is a flow chart showing one implementation of steps executed by a subscriber unit in accordance with the method for resolving contention between a plurality of subscriber units for transmitting data packets to a base site using a channel in a slotted communication system in accordance with the present invention.

FIG. 4, numeral 400, is a flow chart showing one implementation of steps executed by a subscriber unit in accordance with the method for resolving contention between a plurality of subscriber units for transmitting data packets to a base site using a channel in a slotted communication system in accordance with the present invention. The subscriber unit steps include: A) generating a predetermined number of random echo bits (402), E; B) setting echo bits to be transmitted to the base site to the random echo bits for the subscriber unit and placing the echo bits in a next data segment to be transmitted (404), i.e., setting ECHO—BITS—UPLINK=E; C) transmitting the next data segment containing the random echo bits to the base site (406), i.e., where the ECH—FIELD—UPLINK=ECHO—BITS—UPLINK; D) waiting to receive a response segment transmitted from the base site (408), i.e., waiting for a downlink segment from the base site; E) determining whether the response segment equals the random echo bits of the subscriber unit (410), i.e., determining whether ECHO—FIELD—DOWNLINK=ECHO—BITS—UPLINK, and where the response segment equals the random echo bits of the subscriber unit, recycling to step A, and where the response segment is unequal to the random echo bits of the subscriber unit, disabling a transmitter of the subscriber unit (412).

Figure 5:
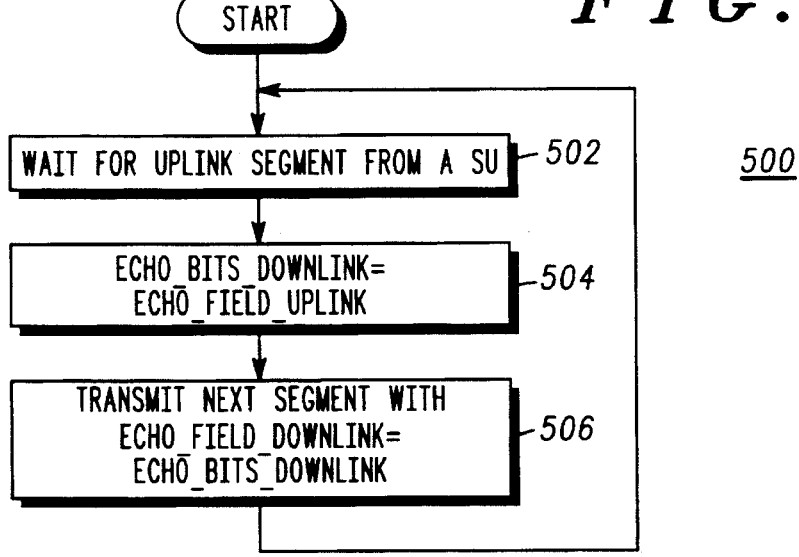
FIG. 5 is a flow chart showing one implementation of steps executed by the base site in accordance with the method for resolving contention between a plurality of subscriber units for transmitting data packets to a base site using a channel in a slotted communication system in accordance with the present invention.

FIG. 5, numeral 500, is a flow chart showing one implementation of steps executed by the base site in accordance with the method for resolving contention between a plurality of subscriber units for transmitting data packets to a base site using a channel in a slotted communication system in accordance with the present invention. The base site steps, where the base site is operating in parallel with the plurality of subscriber unit, include: 1) waiting to receive a transmitted data segment containing the random echo bits from one of the plurality of subscriber units (502), i.e., waiting for an uplink segment from a subscriber unit (SU); 2) upon receiving the transmitted data segment, setting echo bits for the response segment equal to the random echo bits of the received data segment (504), i.e., setting ECHO—BITS—DOWNLINK=ECHO—FIELD—UPLINK; and 3) transmitting the response segment with the random echo bits of the received data segment to the plurality of subscriber units wherein the random echo bits in the response segment are the random echo bits of the subscriber unit that is granted access to the channel (506), i.e., transmitting a next segment with ECHO—FIELD—DOWNLINK=ECHO—BITS—DOWNLINK. The predetermined number of echo bits is typically 2, 3 or 4. As above, a devoted out-of-band signaling channel may be used for transmission of echo bits and transmit access requests, and the in-band signaling channel may be used for transmission of user data.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for resolving contention between subscriber units for a channel in a slotted communication system, comprising the steps of:

A) generating randomly, by each of plurality of subscriber units, a predetermined number of echo bits, B) transmitting, by each of the plurality of subscriber units, a packet segment having the predetermined number of echo bits, to a base site, utilizing a devoted out-of-band signaling channel for transmission of echo bits and transmit access requests and utilizing an in-band signaling channel for transmission of user data, C) decoding, by the base site, a received transmission from at least one of the plurality of subscriber units, and transmitting the echo bits received to subscriber units whose transmissions were received, wherein the devoted out-of-band signaling channel is utilized for transmission of echo bits, D) recycling to generating randomly a predetermined number of echo bits by a subscriber unit whose echo bits match the echo bits transmitted by the base site until a packet ends.

2. The method of claim 1 wherein the predetermined number of echo bits is in a range of 2 to 4 bits.

3. A system for resolving contention between a plurality of subscriber units for transmitting data in packets in a slotted communication system to a base site, comprising:

A) the plurality of contention-resolving subscriber units, for transmitting the packets on a packet channel, wherein each contention-resolving subscriber unit includes a contention resolver for randomly generating echo bits and transmitting a packet having the echo bits and a transmit access request to the base site until in response to receiving echo bits from the base site one of: where the echo bits received from the base site match the echo bits transmitted by the contention-resolving subscriber unit, transmitting data in packets on the packet channel; and where the echo bits received from the base site are non-matching with the echo bits transmitted by the contention-resolving subscriber unit, refraining from transmitting, wherein a devoted out-of-band signaling channel is utilized for transmission of echo bits and transmit access requests and an in-band signaling channel is utilized for transmission of user data;

B) the base site, responsive to the packets from the contention-resolving subscriber units, for decoding a first received packet, granting access for the packet channel to a contention-resolving subscriber unit of the first received packet, and transmitting, to the plurality of contention-resolving subscriber units, the echo bits of the contention-resolving subscriber unit of the first received packet to indicate that the contention-resolving subscribe unit of the first received packet has been granted access to the packet channel, wherein the devoted out-of-band signaling channel is utilized for transmission of echo bits.

4. The system of claim 3 wherein the predetermined number of echo bits is in a range of 2 to 4 bits.

5. A method for resolving contention between a plurality of subscriber units for transmitting data packets to a base site using a channel in a slotted communication system, comprising the steps of:

each subscriber unit:

A) generating a predetermined number of random echo bits;

B) setting echo bits to be transmitted to the base site to the random echo bits for the subscriber unit and placing the echo bits in a next data segment to be transmitted, including utilizing a devoted out-of-band signaling channel for transmission of echo bits and transmit access requests;

C) transmitting the next data segment containing the random echo bits to the base site, including utilizing an in-band signaling channel for transmission of user data;

D) waiting to receive a response segment transmitted from the base site;

E) determining whether the response segment equals the random echo bits of the subscriber unit, and where the response segment equals the random echo bits of the subscriber unit, recycling to step A;

where the response segment is unequal to the random echo bits of the subscriber unit, disabling a transmitter of the subscriber unit;

and the base site, operating in parallel with the subscriber units:

F) waiting to receive a transmitted data segment containing the random echo bits from one of the plurality of subscriber units;

G) upon receiving the transmitted data segment, setting echo bits for the response segment equal to the random echo bits of the received data segment; and H) transmitting the response segment with the random echo bits of the received data segment to the plurality of subscriber units wherein the random echo bits in the response segment are the random echo bits of the subscriber unit that is granted access to the channel, wherein the devoted out-of-band signaling channel is utilized for transmission of echo bits.

6. The method of claim 5 wherein the predetermined number of echo bits is in a range of 2 to 4 bits.

* * * * *